(12) United States Patent
Hopf et al.

(10) Patent No.: US 9,488,832 B2
(45) Date of Patent: Nov. 8, 2016

(54) HEAD-UP DISPLAY COMPRISING A PROJECTION SCREEN AND A DEVICE FOR MOVING AND POSITIONING A PROJECTION SCREEN, AND METHOD FOR OPERATING SUCH A HEAD-UP DISPLAY

(71) Applicant: Visteon Global Technologies, Inc., Van Buren Township, MI (US)

(72) Inventors: Christian Hopf, Wetzlar (DE); Alexander Noel, Hungen-Nonnenroth (DE); Horst Rumpf, Herborn (DE)

(*) Notice: Subject to any disclaimer, the term of this patent is extended or adjusted under 35 U.S.C. 154(b) by 0 days.

(21) Appl. No.: 14/826,809

(22) Filed: Aug. 14, 2015

(65) Prior Publication Data

US 2015/0355464 A1 Dec. 10, 2015

Related U.S. Application Data

(63) Continuation of application No. 13/824,870, filed as application No. PCT/EP2011/066082 on Sep. 16, 2011, now Pat. No. 9,110,285.

(30) Foreign Application Priority Data

Sep. 18, 2010 (DE) .......................... 10 2010 046 008

(51) Int. Cl.
  *G02B 27/14* (2006.01)
  *G09G 5/00* (2006.01)
  *G02B 27/01* (2006.01)

(52) U.S. Cl.
  CPC .......... *G02B 27/01* (2013.01); *G02B 27/0149* (2013.01); *G02B 2027/0156* (2013.01); *G02B 2027/0159* (2013.01); *G02B 2027/0163* (2013.01)

(58) Field of Classification Search
  CPC .......... G02B 27/0172; G02B 2027/0154; G02B 2027/0163; G02B 2027/0165; G02B 2027/0178; G02B 2027/0181; G02B 27/01; G02B 27/0101; G02B 27/0149; G02B 2027/0192

USPC .................................. 359/630–632; 345/7–9
See application file for complete search history.

(56) References Cited

U.S. PATENT DOCUMENTS

| | | | |
|---|---|---|---|
| 4,664,475 A | 5/1987 | Ferrer | |
| 5,237,455 A | 8/1993 | Bordo et al. | |
| 5,457,575 A | 10/1995 | Groves et al. | |
| 6,930,836 B2 | 8/2005 | Harada et al. | |
| 2008/0285138 A1 | 11/2008 | Lebreton | |

FOREIGN PATENT DOCUMENTS

| | | |
|---|---|---|
| JP | 09-109787 A | 4/1997 |
| WO | 20080063632 A2 | 5/2008 |
| WO | 2009138353 A1 | 11/2009 |

OTHER PUBLICATIONS

Japanese Office Action for application No. 2013-528682 mailed Oct. 7, 2014. Chinese Office Action for application No. 201180054081.8 issued Aug. 28, 2014.
International Search Report for application No. PCT/EP2011/066082 mailed Feb. 17, 2012.
Japanese Office Action for application No. 2013-528682 mailed Apr. 15, 2014.
Korean Office Action for application No. 10-2013-7009780 issued Apr. 24, 2014.

*Primary Examiner* — William Choi
(74) *Attorney, Agent, or Firm* — Fletcher Yoder, P.C.

(57) ABSTRACT

The invention relates to a head-up display comprising a projection screen and a device for moving and positioning said projection screen. To open or close the projection screen by the device, a linear movement with a short path can be transformed into a pivoting movement with a long path, an adjustment of the incline of the projection screen being actuatable by means of the device when the projection screen is in the operating position. A method for operating a head-up display comprises actions of a projection screen and a device for moving and positioning a projection screen.

11 Claims, 2 Drawing Sheets

Figure 1:
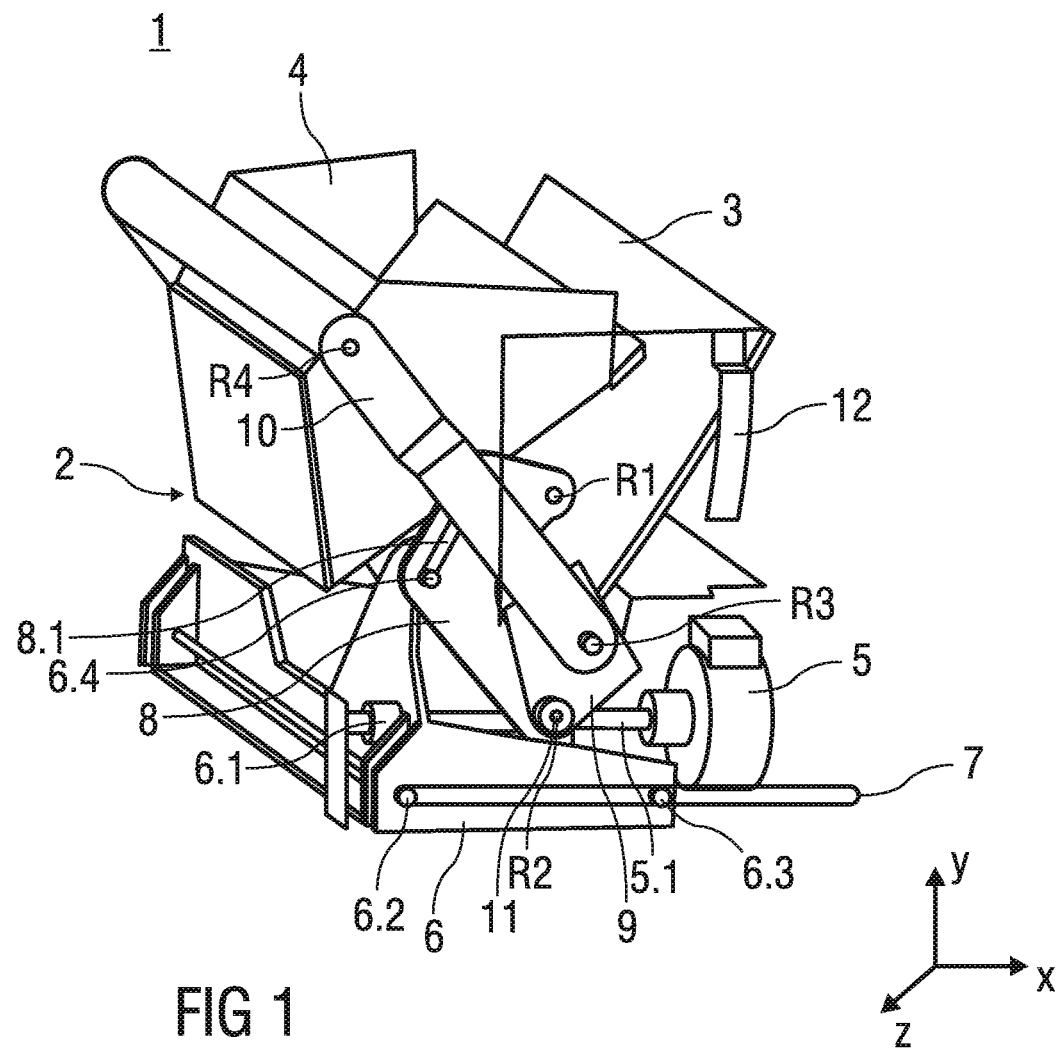

HEAD-UP DISPLAY COMPRISING A PROJECTION SCREEN AND A DEVICE FOR MOVING AND POSITIONING A PROJECTION SCREEN, AND METHOD FOR OPERATING SUCH A HEAD-UP DISPLAY

CROSS REFERENCE TO RELATED APPLICATIONS

This application is a continuation of U.S. patent application Ser. No. 13/824,870, entitled "HEAD-UP DISPLAY COMPRISING A PROJECTION SCREEN AND A DEVICE FOR MOVING AND POSITIONING A PROJECTION SCREEN, AND METHOD FOR OPERATING SUCH A HEAD-UP DISPLAY", filed Jun. 3, 2013, which is a national stage of PCT Application No. PCT/EP2011/066082, filed on Sep. 16, 2011, which claims priority from and the benefit of German Patent DE 10 2010 046 008.7, filed Sep. 18, 2010. Each of the foregoing applications is herein incorporated by reference in its entirety.

BACKGROUND

The invention relates to a head-up display comprising a projection screen and device for moving and positioning a projection screen. The invention further relates to a method for operating such a head-up display.

Head-up displays of this type are generally known from prior art and comprise a display unit with a projection screen onto which vehicle information is projected by means of an image-providing unit and, where applicable, by means of an optical module. In this instance the projection screen is of transparent design and located in the field of vision of the driver of the vehicle.

In its deactivated state, the head-up display is in particular retractable into a cavity within and below the surface of an instrument panel of a vehicle and extendable from this cavity when operation is required.

Adjustment of an incline of the projection screen about a horizontal incline axis is required, in particular with reference to the height and the resulting sitting position of the driver of the vehicle, in order to achieve an optimized display distinguished in particular by a geometrically clean and distortion-free presentation of the information to the driver of the vehicle. To this end, a very fine adjustment is required. At the same time, a secure fixing of the projection screen in the adjusted position is required in order to prevent a positional change during the operation of the head-up display.

SUMMARY

The object of the invention is to provide an improved head-up display with a projection screen and a device for moving and positioning a projection screen, and an improved method for operating such a head-up display.

With reference to the head-up display, the object is achieved according to the invention with a projection screen and a device for moving and positioning a projection screen.

With reference to the method, the object is achieved according to the invention with a method for operating a head-up display with a projection screen and a device for moving and positioning a projection screen.

Preferred embodiments and further embodiments of the invention are the subject matter of the dependent claims.

In the head-up display comprising a projection screen and a device for moving and positioning the projection screen, according to the invention, in order to extend or retract the projection screen, by means of the device, a linear movement with a short path can be transformed into a pivoting movement with a long path, an adjustment of the incline of the projection screen being actuable by means of the device when the projection screen is in the operating position. This advantageously makes possible a head-up display which is characterized by a particularly small space requirement and is, at the same time, simple to implement.

It is particularly advantageous that the extension or retraction of the projection screen and also an adjustment of the incline of the projection screen in its operating position are actuatable by means of a single drive unit.

The device can be moved by means of a drive unit which is embodied preferably as a stepper motor.

The drive unit is expediently coupled mechanically to a slide, such that a rotating motion of the drive unit is transformable into a linear movement of the slide in a guide rail. At least two guide pins are located on the slide which project into the guide rail and embody end stops for the slide within the guide rail.

The slide is mechanically coupled to a transformation element by means of a connecting pin, the connecting pin projecting into a slotted hole located in the transformation element, and the transformation element being rotatably or pivotably mounted about a fixed first rotation axle.

The transformation element and the base element are preferably rotatably or pivotably coupled to one another by means of a second rotation axle, the base element being fixedly mounted on the projection screen.

A lever element is rotatably or pivotably coupled advantageously at its end to the base element by means of a third rotation axle, the lever element being rotatably or pivotably mounted at its end on the side remote from the third rotation axle on a fixed fourth rotation axle.

A pin element is located on the end of the second rotation axle, which pin element, in the operating position of the projection screen, is in functional connection with the positioning element, with a guide structure being integrated into the positioning element.

In the operating position of the projection screen, a movement of the slide by means of the drive unit causes a pivoting of the projection screen about the rotation axle and a resulting adjustment of the incline of the projection screen.

In the method for operating a head-up display comprising a projection screen and a device for moving and positioning a projection screen, according to the invention, to extend or retract the projection screen, by means of the device, a linear movement with a short path is transformed into a pivoting movement with a long path, an incline of the projection screen being adjusted by means of the device when the projection screen is in the operating position. This in particular advantageously results in only a small space requirement for the integration of the head-up display into the vehicle. At the same time a very short optical path between the image-providing unit and the projection screen is feasible. This again results advantageously in an improved image quality of the information displayed on the projection screen. In particular, higher levels of sharpness, brightness and contrast are achieved.

The projection screen in its rest position is, in particular, advantageously located entirely within an instrument panel.

The projection screen in its operating position is expediently moved out of the instrument panel and positioned in such a way that it is located in an optical path of the image-providing unit.

DRAWINGS

Figure 2:
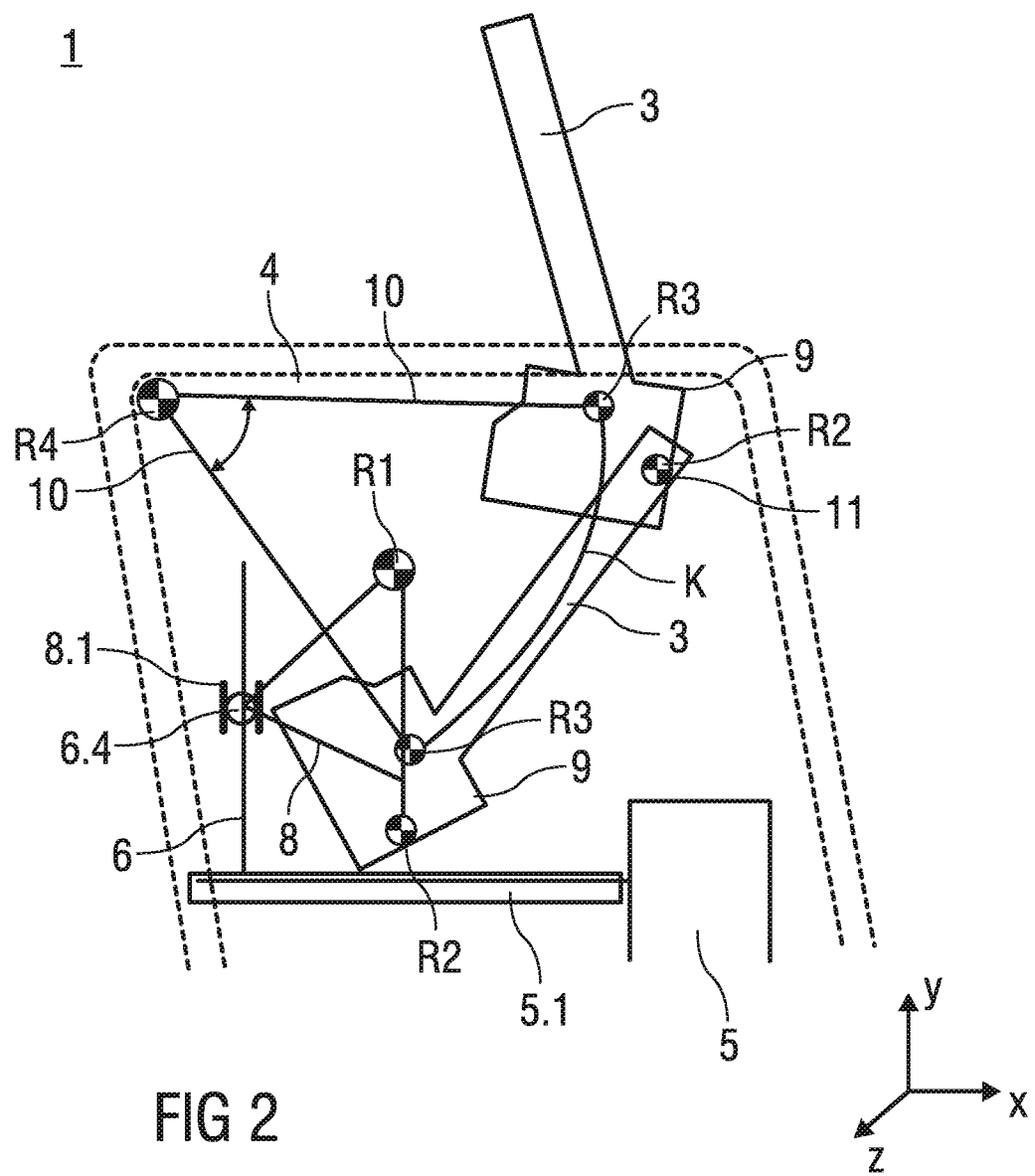

Exemplary embodiments of the invention are explained in more detail in the following with reference to drawings, in which FIG. 1 shows a schematic perspective view of a head-up display according to the invention comprising a device for moving and positioning a projection screen, and FIG. 2 shows a further schematic illustration of the head-up display.

DETAILED DESCRIPTION

Parts which are identical to one another are shown with the same reference signs in all drawings.

In FIG. 1, a head-up display 1 according to the invention comprising a device 2 for moving and positioning a projection screen 3 of a head-up display 1 is shown in a perspective view. FIG. 2 shows the head-up display 1 and the motion sequence of the projection screen 3 in a schematic illustration. The invention is explained in the following with concurrent reference to both figures.

Apart from the projection screen 3, the head-up display 1 comprises an image-providing unit 4, by means of which the information to be displayed is projected onto the projection screen 3. The head-up display 1 is preferably mounted in a cavity of an instrument panel of a motor vehicle in a fashion not illustrated, the projection screen 3 being embodied and located in such a way that it is fully movable. That is to say that the projection screen 3 is retractable into the cavity below the surface of the instrument panel and extendable from this cavity when the head-up display 1 needs to be operated. When being extended from the cavity, the projection screen 3 is positioned in such a way that it is located in an optical path of the image-providing unit 4.

The device 2 is provided for moving the projection screen 3 during retraction and extension, and for positioning the projection screen 3.

The device 2 comprises a drive unit 5, the drive unit 5 being embodied in particular as an electric motor, preferably as a stepper motor. The drive unit 5 has a rotatable shaft 5.1, in the surface of which are formed screw threads which fully encircle the shaft 5.1.

The shaft 5.1 is coupled to a slide 6 which is located so as to be movable in the direction of x, the slide 6 comprising a coupling element 6.1 with a bore corresponding to the shaft 5.1. Screw threads are embodied within the bore which correspond to the screw threads of the shaft 5.1. The screw threads are located such that a rotation motion of the shaft 5.1 about its longitudinal axis results in a linear movement of the slide 6 in a guide rail 7. For the purpose of this guidance, the slide 6 comprises two guide pins 6.2, 6.3, which project into the guide rail 7. At the same time, the guide pins 6.2, 6.3 embody end stops for the slide 6 within the guide rail 7.

The slide 6 is coupled to a transformation element 8 by means of a connecting pin 6.4, the connecting pin 6.4 projecting into a slotted hole 8.1 located in the transformation element 8. The transformation element 8 is rotatably mounted within the head-up display 1 by means of a fixed first rotation axle R1.

The transformation element 8, in turn, is coupled to a base element 9 to which the projection screen 3 is mounted. The transformation element 8 and the base element 9 are rotatably coupled to one another by means of a second rotation axle R2.

A lever element 10 is connected to the base element 9 by means of a third rotation axle R3, the lever element 10 being rotatably mounted on the side remote from the rotation axle R3 on a fourth rotation axle R4, which is fixedly mounted inside the head-up display 1.

During the extension of the projection screen 3, the slide 6 is moved in the direction of x by means of the shaft 5.1 of the drive unit 5. In this context, the transformation element 8, due to its coupling with the slide 6 by means of the connecting pin 6.4, is pivoted about the first rotation axle R1 such that the linear movement of the slide 6 is transformed into a rotation motion. At the same time, the base element 9 is moved in the direction of y along a circular path K, which is predetermined by means of the lever element 10 being pivotably mounted on the fourth rotation axle R4. This results in the projection screen 3 being moved into the optical path of the image-providing unit 4.

When the projection screen 3 and the base element 9 have reached an upper end position, a pin element 11 located on the end of the second rotation axle R2 engages in a functional connection with a positioning element 12. The pin element 11 and the positioning element 12 are embodied in such a way that an incline of the projection screen 3 is adjustable through further movement of the slide 6 by means of the drive unit 5. For this purpose, the positioning element 12 comprises a guide structure which is not illustrated, in which the pin element 11 is guided such that the projection screen 3, when in the upper end position, is pivoted about the third rotation axle R3. The guide structure is embodied in such a fashion that the pivoting about the rotation axle R3 can be predetermined very precisely, thus enabling the adjustment of incline to be implemented very delicately, steplessly and very precisely.

The design of the head-up display 1 and the device 2 advantageously results in the extension and the retraction of the projection screen 3 from the cavity in the instrument panel and a pivoting of the projection screen 3 for the adjustment of its incline being simultaneously implementable despite the very small space requirement of the head-up display 1 comprising the device 2. It is furthermore particularly advantageous that only the one drive unit 5 is required for this.

The invention claimed is:

1. A head-up display, comprising:
    a projection screen;
    a device configured to move and to position the projection screen, wherein the device is configured to transform a first linear movement with a short path into a pivoting movement with a long path to extend or retract the projection screen;
    wherein the device is configured to move by a drive unit;
    wherein an adjustment of an incline of the projection screen is configured to be actuatable by the device when the projection screen is in an operating position;
    wherein the drive unit is mechanically coupled to a slide, and wherein a rotating motion of the drive unit is configured to be transformed into a second linear movement of the slide relative to a guide rail;
    wherein the slide is mechanically coupled to a transformation element by a connecting pin, the connecting pin projects into a slotted hole located in the transformation element, and the transformation element is rotatably or pivotably mounted about a fixed first rotation axle;
    wherein the transformation element and a base element are rotatably or pivotably coupled to one another by a second rotation axle, the base element being fixedly mounted on the projection screen;

wherein a lever element is rotatably or pivotably coupled at a first end to the base element by a third rotation axle and rotatably or pivotably mounted at a second end, on a side remote from the third rotation axle, on a fixed fourth rotation axle;

wherein a pin element is located on an end of the second rotation axle, and the pin element, in the operating position of the projection screen, is in functional connection with a positioning element, into which a guide structure is integrated; and wherein, in the operating position of the projection screen, the second linear movement of the slide by the drive unit causes a pivoting of the projection screen about the third rotation axle and a resulting adjustment of the incline of the projection screen.

2. The head-up display as claimed in claim 1, wherein the drive unit comprises a stepper motor.

3. The head-up display as claimed in claim 1, comprising at least two guide pins on the slide projecting into the guide rail, the guide pins forming end stops for the slide within the guide rail.

4. A method for operating the head-up display as claimed in claim 1, wherein to extend or retract the projection screen by the device, the first linear movement with the short path is transformed into the pivoting movement with the long path, wherein the incline of the projection screen is adjusted by the device when the projection screen is in the operating position.

5. The method as claimed in claim 4, wherein the projection screen in a rest position is located entirely within an instrument panel.

6. The method as claimed in claim 4, wherein the projection screen in the operating position is moved out of an instrument panel and positioned in such a way that the projection screen is located in an optical path of an image-providing unit.

7. A head-up display, comprising:
a projection screen;
a device configured to move and to position the projection screen, wherein the device is configured to transform a first linear movement with a short path into a pivoting movement with a long path to extend or retract the projection screen, the long path is longer than the short path, and the device is configured to adjust an incline of the projection screen when the projection screen is in an operating position;
a drive unit configured to move the device;

wherein the device comprises:
a slide mechanically coupled to the drive unit and a guide rail configured to control movement of the slide, wherein a rotating motion of the drive unit is configured to induce a second linear movement of the slide relative to the guide rail;
a transformation element mechanically coupled to the slide via a connecting pin, wherein the transformation element comprises a slotted hole configured to receive the connecting pin, and the transformation element is rotatably or pivotably mounted about a fixed first rotation axle;
a base element rotatably or pivotably coupled to the transformation element via a second rotation axle, wherein the base element is fixedly mounted to the projection screen, the second rotational axle comprises a pin element located on a first end of the second rotation axle, and the pin element, in an operating position of the projection screen, is in functional connection with a positioning element, into which a guide structure is integrated; and
a lever element rotatably or pivotably coupled at a first end to the base element by a third rotation axle and rotatably or pivotably mounted at a second end, on a side remote from the third rotation axle, on a fixed fourth rotation axle;

wherein, in the operating position of the projection screen, the second linear movement of the slide induces a pivoting of the projection screen about the third rotation axle and a resulting adjustment of the incline of the projection screen.

8. The head-up display of claim 7, wherein the drive unit comprises a stepper motor.

9. The head-up display of claim 7, comprising at least two guide pins on the slide projecting into the guide rail, wherein the guide pins form end stops for the slide within the guide rail.

10. The head-up display of claim 7, wherein the projection screen is configured to be located entirely within an instrument panel when the projection screen is in a rest position.

11. The head-up display of claim 10, wherein the projection screen is configured to be moved out of the instrument panel and positioned in such a way that the projection screen is located in an optical path of an image-providing unit when the projection screen is in the operating position.

* * * * *